UNITED STATES PATENT OFFICE.

ALLEN ROGERS, OF BROOKLYN, NEW YORK, ASSIGNOR TO THE OCEAN LEATHER CO., OF NEW YORK, N. Y., A CORPORATION OF DELAWARE.

TREATING OF SHARK-SKINS AND THE LIKE PREPARATORY TO TANNING.

1,338,531.     Specification of Letters Patent.     Patented Apr. 27, 1920.

No Drawing.     Application filed May 8, 1919. Serial No. 295,549.

*To all whom it may concern:*

Be it known that I, ALLEN ROGERS, a citizen of the United States, residing at Brooklyn, county of Kings, State of New York, have invented certain new and useful Improvements in Treating of Shark-Skins and the like Preparatory to Tanning, of which the following is a specification.

This invention relates to the treatment of shark skins and the like that may possess a hard or horny coating known as dermal armoring preliminary to the actual tanning process. Many and varied unsuccessful attempts have been made to remove this coating by use of chemicals and mechanical means. So long as this dermal armoring remains on the stock, it is impossible to convert the substance into a satisfactory leather for shoe or dressing purposes.

In my invention I treat the skin, while it is still on the animal, with boiling water or live steam. In this way the dermal armoring is loosened and may be readily and easily removed by means of a blunt knife or wire brush. The subsequently flayed skin, which is in a perfectly smooth condition, may be handled in a manner similar to the skin from any terrestrial animal.

My process consists essentially in dipping the whole fish into boiling water, although I have found it practical to spray the fish with boiling water or subject it to live steam. The time of treatment requires only the fraction of a minute, although a longer treatment in no wise causes damage to the stock. This application of boiling water or steam to the whole fish is essential to prevent the burning of the skin, which, if treated in a like manner off the animal, would curl and plump. Having removed the dermal armoring by scraping, the skin may be flayed and salted for shipment. I prefer, however, to complete my process by a further depilating treatment to remove the epithelium layer which lies under the dermal armoring and which must also be removed before satisfactory leather can be produced. From my experience in handling this class of raw stock, I find that a mixture of five parts of lime to one part of sodium sulfid is the most satisfactory, although good results have been obtained with all of the other standard depilating agents. Should the stock be salted, as mentioned above, it will later be necessary to lime the skins before tanning.

Following the liming, I work the skins on a beam to remove the epithelium layer and excess of flesh and then bate, pickle or drench according to the tannage which I intend to follow.

What is claimed as new is:—

1. A step in the method for removing the dermal armoring from shark skins and the like, which consists in subjecting the same to the action of heated fluid.

2. A step in the method for removing the dermal armoring from shark skins and the like, which consists in subjecting the same to the action of live steam.

3. A method for loosening the dermal armoring from shark skins and the like by treatment with boiling water and subsequently removing the said armoring while hot.

4. A step in the method for removing the dermal armoring from shark skins and the like, while the skin is still on the body of the fish, which consists in subjecting the same to the action of heated fluid.

5. A step in the method of removing the dermal armoring from shark skins and the like, while the skin is still on the body of the fish, which consists in subjecting the same to the action of heated fluid.

6. A method of removing the dermal armoring from shark skins and the like, while still on the body of the fish, which consists in subjecting the same to the action of heated fluid, subsequently removing said armoring, flaying the skins and removing the epithelium layer by treating the flayed skins with a depilating agent.

7. A method for removing the dermal armoring from shark skins and the like, while the skin is still on the body of the fish, which consists in subjecting the same to the action of heated fluid, subsequently removing said armoring, flaying the skins and removing the epithelium layer from the flayed skins with a mixture of five parts of lime and one part of sodium sulfid.

In testimony whereof I affix my signature.

ALLEN ROGERS.